United States Patent [19]

Lowe et al.

[11] Patent Number: 4,624,322
[45] Date of Patent: Nov. 25, 1986

[54] HARROW WITH LINK HAVING SPIKE SUPPORT ATTITUDE CONTROL

[75] Inventors: Terry L. Lowe; John D. Long, both of Ankeny, Iowa

[73] Assignee: Deere & Company, Moline, Ill.

[21] Appl. No.: 772,597

[22] Filed: Sep. 4, 1985

[51] Int. Cl.⁴ ............................................. A01B 19/00
[52] U.S. Cl. ................................... 172/620; 172/639
[58] Field of Search .............. 172/391, 614, 615, 618, 172/619, 620, 621, 622, 633, 634, 635, 639, 640, 645, 659, 660, 702, 712

[56] References Cited

U.S. PATENT DOCUMENTS

| | | | |
|---|---|---|---|
| 198,401 | 12/1887 | Marshall | 172/620 |
| 210,046 | 11/1878 | McDonald | 172/618 |
| 256,619 | 4/1882 | Barley | 172/618 |
| 350,893 | 10/1886 | Pates | 172/618 X |
| 639,813 | 12/1899 | Jerdee | 172/712 |
| 1,050,710 | 1/1913 | Akers | 172/712 |
| 1,430,483 | 9/1922 | Wolverton | 172/712 |

Primary Examiner—Richard T. Stouffer

[57] ABSTRACT

A flexible spike-tooth harrow having a plurality of tooth-supporting angles spaced fore-and-aft by connecting structure including reversible link straps having opposed edge surfaces on one end thereof tapered with respect to the axis of the strap at differing angles. A selected one of the edges is positioned against the top side of the angle to maintain the spikes in a preselected working attitude. By simply reversing the strap with respect to its longitudinal axis, the working angle of the spikes can be changed.

7 Claims, 4 Drawing Figures

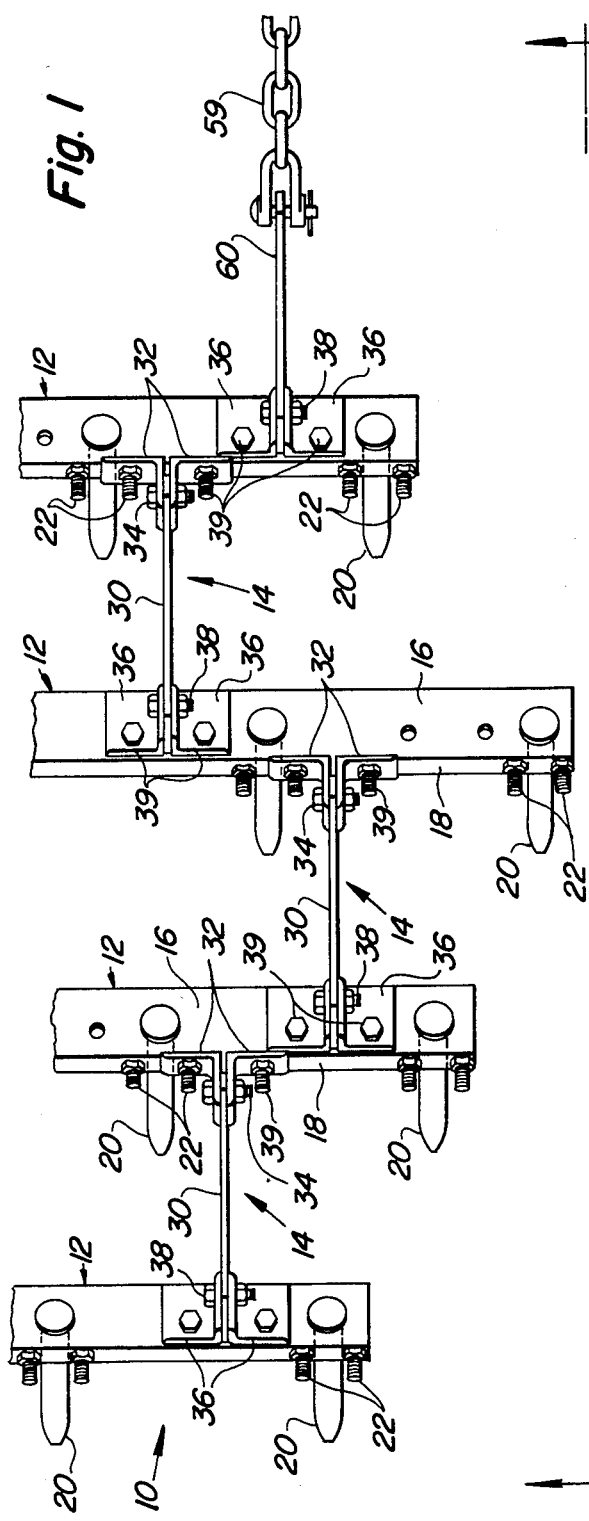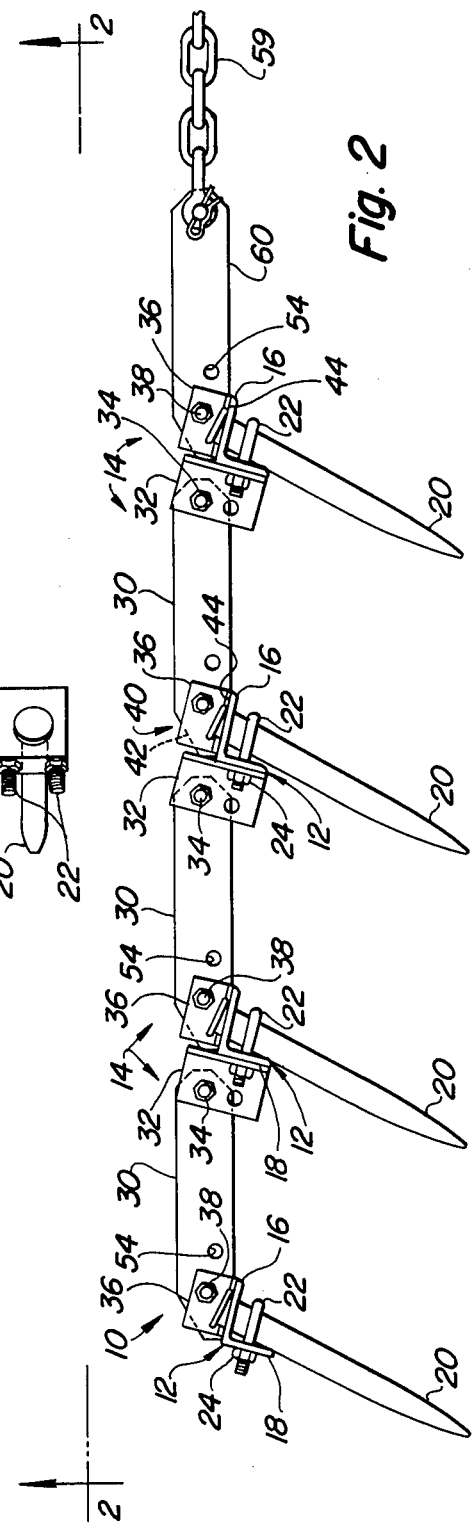

HARROW WITH LINK HAVING SPIKE SUPPORT ATTITUDE CONTROL

BACKGROUND OF THE INVENTION

The present invention relates to harrows, and more specifically to spike-tooth harrows with means for adjusting the operating angle of the teeth.

Spike-tooth harrows are used extensively in agriculture for such operations as leveling the soil and breaking up large clods. Ranks of teeth are supported at a preselected working angle, which is either fixed or adjustable. One of the most common types of adjustable angle harrows includes pivoting tooth bars connected to linkage structure, which often takes the form of a four-bar linkage arrangement, and movable with a lever. Although these and other types of adjustable harrows have in general worked satisfactorily, the linkage arrangements for adjusting and maintaining the working angle have, for the most part, significantly increased the cost, complexity and size of the harrow over that of the nonadjustable types. In some harrows, rigid fore-and-aft extending, connecting and adjusting structure tends to limit harrow flexibility.

OBJECTS OF THE INVENTION

It is therefore an object of the invention to provide an improved harrow wherein the operating angle of the teeth is adjustable. It is a further object to provide such a harrow which is less costly and complex than at least most previously available adjustable harrows. It is still a further object to provide such a harrow wherein the selected working angle of the teeth is reliably maintained without limiting the flexibility of the harrow.

It is another object of the invention to provide an improved flexible harrow wherein relatively simple and inexpensive links between the tooth-supporting bars, in addition to spacing the ranks, selectively support the teeth at one of two given working angles. It is another object to provide such a harrow wherein the bars and brackets connecting the links to the bars comprise angles for simple construction and reliable tooth support at the selected working angle.

It is still another object of the invention to provide a harrow having ranks of teeth spaced fore-and-aft by rotatable or reversible connecting links, wherein the working angle of the teeth is adjustable by simply rotating or reversing the connecting links.

BRIEF DESCRIPTION OF THE INVENTION

A flexible spike-tooth harrow constructed in accordance with the teachings of the present invention includes a plurality of transversely extending tooth-support angles, supported in fore-and-aft relationship by link straps attached to angle brackets on adjacent forward and rearward angles. Each strap is connected at its forward end to an angle bracket connected to the aft side of the forward tooth-support angle. The aft end of the link strap includes opposed inclined surfaces which are angled with respect to the axis of the link strap, with the lower surface adapted to engage the top of the tooth-support angle. A second angle bracket connects the rear tooth-support angle to the aft end of the link strap and the surface maintains the teeth in a preselected working attitude relative to the axis of the link strap. By rotating the link strap about its axis so that the opposite surface bears against the top of the tooth-support angle, the working attitude of the teeth can be changed. Therefore, pivots, additional linkages and levers are eliminated, and the link straps, which are relatively inexpensive, serve not only to connect the ranks of teeth but also to reliably maintain the teeth at a preselected working angle which can be changed by reversing the link strap. The basic framework of the flexible harrow is therefore relatively simple and inexpensive, and the flexibility of the harrow is maintained without sacrificing reliable tooth support.

These and other objects, features and advantages of the present invention will become apparent to one skilled in the art upon reading the following detailed description in view of the drawings.

BRIEF DESCRIPTION OF THE DRAWINGS

FIG. 1 is a top view of the right-hand portion of a flexible harrow constructed in accordance with the teachings of the present invention.

FIG. 2 is a view taken essentially along lines 2—2 of FIG. 1.

DESCRIPTION OF THE PREFERRED EMBODIMENT

Figure 3:
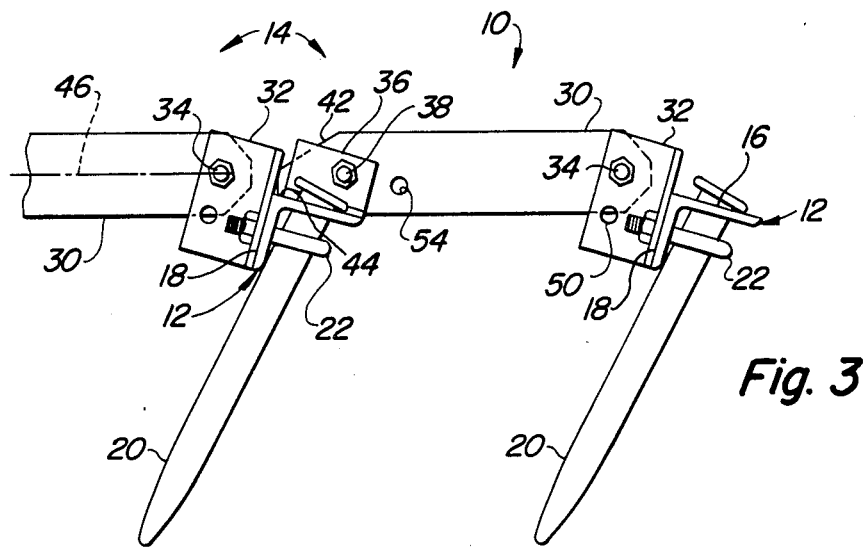
FIG. 3 is an enlarged side view of a portion of the harrow of FIG. 1 showing the teeth in a preselected working angle.
Figure 4:
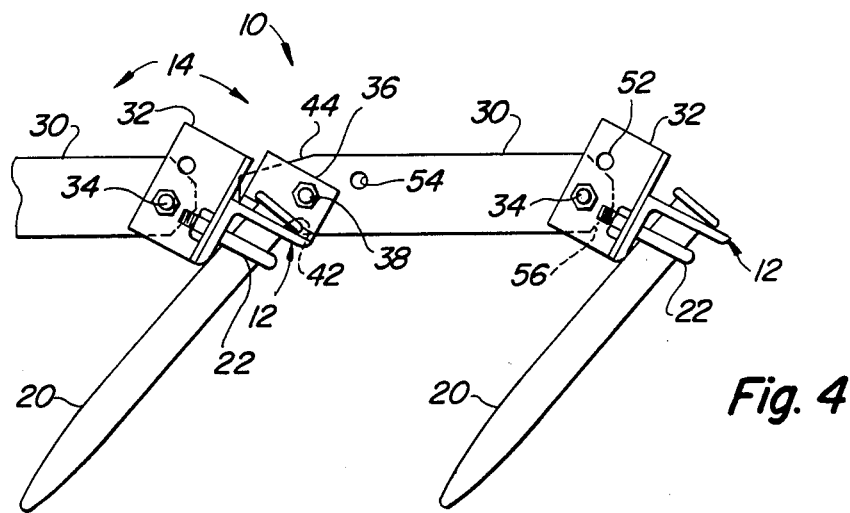
FIG. 4 is a view similar to FIG. 3 but with the link straps reversed so that the working angle of the teeth relative to the vertical is increased.

Referring now to the drawings, therein is shown a portion of a flexible spike-tooth harrow 10 adapted for towing in the forward direction (to the right as viewed in FIGS. 1-4). The harrow 10 includes a plurality of transversely extending spike- or tooth-supporting members 12 spaced fore-and-aft in parallel relationship by connecting structure indicated generally at 14. The tooth-supporting members 12 are fabricated from angles having an upper surface 16 and a rear upright surface 18. A plurality of conventional spikes or teeth 20 extend downwardly through apertures in the upper surface 16 equally spaced along the length of the member 12. The spikes 20 are fixed to the member 12 by a U-bolt 22 which extends around the upper portion of the spike 20 and through apertures in the rear upright surface 18. Nuts 24 are tightened on the threaded ends of the U-bolt 22 to urge the spike 20 against the lower portion of the angle 12 and against the aft portion of the aperture in the upper surface 16 to rigidly secure the spike 20 in the member 12. The arrangement of the supporting members 12 and the spikes 20 for each of the ranks of spikes is generally identical, but the members 12 are offset transversely with respect to each other so that the spikes 20 are staggered from rank to rank.

The connecting structure 14 includes a flat reversible link strap 30 pivotally connected to the forward tooth-supporting member 12 by a pair of angle brackets 32 and a pivot bolt 34. The forward end of the link is connected to the upper surface 16 of the rearward tooth-supporting member 12 by a second pair of angle brackets 36 and a bolt 38. The angle brackets 36 are secured to the members 12 by bolts 39 while the angle brackets 32 are secured either by additional bolts 39 or a portion of the U-bolts 22 depending on the location of the bracket relative to the spikes 20.

The link strap 30 includes a rear portion indicated generally at 40 which is adapted to be secured between the parallel flanges of the angle brackets 36. The portion 40 includes tapered, opposed edge surfaces 42 and 44 which taper inwardly at different angles with respect to the longitudinal axis, indicated generally at 46, of the strap 30. The strap 30 is selectively reversible or rotatable about the axis 46 so that a selected one of the surfaces 42 or 44 bears against the top surface 16 of the angle 12 when the strap 30 is attached to the brackets 36. The angle of the edge surface 44 with respect to the axis 46 is substantially less than that of the edge 42 so that when the link is in the position shown in FIGS. 2 and 3, the spike 20 assumes a smaller angle with respect to the vertical than when the strap is in the position shown in FIG. 4 with the edge surface 42 bearing against the upper surface 16 of the angle 12. Therefore, by simply reversing the link 30 about its longitudinal axis 46, one of two preselected working angles can be chosen and reliably maintained.

In the preferred embodiment, each of the link straps 30 is maintained in substantially a vertical, fore-and-aft extending upright plane with the axis 46 of the link generally parallel to the ground surface. The arrangement of the brackets 32 and the pivot bolt 34 permit the link to rock about the axis of the pivot bolt 34 while the brackets 36 and bolt 38 fix the link 30 to the top surface 16 of the angle 12 with the selected one of the edge surfaces 42 or 44 bearing against the surface 16 to prevent relative rotation between the strap 30 and the angle 12. The brackets 32 include a lower hole 50 (FIGS. 2 and 3 ) and an upper hole 52 (FIG. 4) so that as the working angle of the spikes 20 is changed by reversing of the link 30 about its axis 46, the link 30 can be maintained in a generally horizontal attitude by simply changing hole locations in the bracket 32. With the link in the position shown in FIG. 3 with the edge surface 44 bearing against the top surface 16, the pivot bolt 34 is inserted through the upper hole 52 of the bracket 32. When the bracket 30 is reversed so that the more steeply angled edge 42 bears against the top surface 16 of the angle 12, the brackets 36 are lowered with respect to the brackets 32 so that the pivot bolt 34 must be inserted into the lower hole 50 to maintain the link 30 substantially level. Each of the links 30 includes an indexing hole 54 offset to one side of the axis of the strap or other identifying mark to help the operator when setting up the harrow to position the links properly for the desired angle. The forward corners of the strap 30 are cut or beveled at the area 56 so that the strap can freely pivot about the axis of the pivot bolt 34 without interference from the rear upright surface 18 of the angle 12. In the preferred embodiment, the difference between the angles of the edges 42 and 44 with respect to the axis 46 of the strap is approximately 15 degrees so that by reversing the strap 30, the working angle of the spikes 20 are changed by approximately 15 degrees. As shown in the drawings, the working angle of the spikes 20 is changed from 30 degrees with respect to the vertical (FIG. 3) to 45 degrees with respect to the vertical (FIG. 4) by reversing the straps 30. These angles are given by way of example only, and it is to be understood that other working angles may also be provided by changing the angles of inclination of the edges 42 and 44 or by changing the relative angles of the spikes 20 with respect to the supporting member or angle 12. At least two transversely spaced straps 30 connect each of the angles 12 to the rearwardly adjacent angle 12 in parallel, staggered relationship. A towing arrangement, such as a chain 59 connected to the forwardmost angle 12, is utilized to connect the harrow 10 to a forward implement or towing vehicle. The chain 59 is connected to the forward end of a link 60 which is similar in construction to the links 30, and the aft end of the link 60 is attached to the top of the angle 12 by brackets 36 and a bolt 38. As the implement 10 is towed forwardly through the field, the links 30 may pivot about the pivotal connection at 34 with the preceding angle 12 to permit the harrow to flex over irregularities in the ground surface. The angle construction of the tooth-supporting members 12 and the brackets 32 and 36, and the upright connecting strap arrangement which not only spaces the members 12 but also maintains the spikes 20 in one of two working angles, provides a simple and inexpensive, and yet sturdy and reliable harrow arrangement.

Having described the preferred embodiment, it will be apparent that modifications can be made without departing from the scope of the invention as defined in the accompanying claims.

We claim:

1. In a harrow adapted for forward movement over the soil:
    a plurality of transverse spike supports;
    a plurality of spikes fixed to the supports; and
    means connecting the spike supports in fore-and-aft spaced relationship, said means including a fore-and-aft extending flat link having a longitudinal axis and means for selectively connecting the link between adjacent spike supports in one of a plurality of positions, said link terminating at one end in structure for maintaining at least one of the supports in a preselected attitude with respect to the vertical, said attitude dependent on the selected link position, wherein said one end includes opposed edges angled with respect to the longitudinal axis at different angles and said link is rotatable about said axis to position a selected one of the edges adjacent said one of the spike supports, and means for securing said selected one of the edges against said one of the spike supports to prevent substantial relative movement between the link and said spike support.

2. The invention as set forth in claim 1 including means for maintaining the link in substantially a horizontal attitude regardless of which edge is selectively secured against said one of the spike supports.

3. In a harrow adapted for forward movement over the soil:
    a forward, transversely extending member;
    a transversely extending spike-supporting member located rearwardly of the forward member;
    a reversible link;
    means connecting the link in one of two selectively reversible positions between the forward member and the spike-supporting member for spacings in members fore-and-aft, wherein said link includes attitude control means for supporting the second member in one of two preselected angles with respect to the vertical dependent on the selected position of the link; and
    wherein the spike-supporting member comprises an angle having an upper generally horizontal surface and a rearward upright surface, wherein said reversible link comprises a generally flat, upright strap having an aft end with opposed angled edges, and wherein the means connecting the link comprises a bracket connected to the horizontal surface of the angle and supporting one of the edges against the horizontal portion for maintaining the angle in a preselected attitude with respect to the link.

4. The invention as set forth in claim 3 including a bracket connected to and extending rearwardly from the forward member, and means pivotally connecting the forward end of the strap to the bracket.

5. A flexible spike-tooth harrow adapted for forward movement over the soil comprising:
   a plurality of spike-supporting members;
   connecting structure extending between the supporting members and maintaining the members in fore-and-aft spaced and generally parallel relationship, said connecting structure including a plurality of fore-and-aft extending links connected between adjacent pairs of the supporting members, each of said links including a forward end terminating adjacent and pivotally connected to the forwardmost supporting member of the pair, said link extending rearwardly to an aft end terminating adjacent and connected to the trailing supporting member of the pair, wherein the link includes a pair of outermost edge surfaces adapted to selectively engage the trailing supporting member of the pair, and means permitting the reversal of the link to selectively engage one of the edge surfaces with the trailing supporting member to maintain a preselected attitude of the trailing member with respect to the link to thereby control the working angle of the spike supported on said trailing support members wherein the link includes a longitudinal axis, the pair of surfaces are located on opposite sides of the longitudinal axis and only one of the edge surfaces contacts the supporting member at a time, and the link is reversible by rotating the link about its axis.

6. The invention as set forth in claim 5 wherein the link comprises a flat, generally upright strap.

7. The invention as set forth in claim 6 wherein the edge surfaces are tapered inwardly at different angles with respect to the axis of the link.

* * * * *